United States Patent Office

3,548,008
Patented Dec. 15, 1970

3,548,008
PREPARATION OF MERCAPTANS AND SULFIDES
Gene Ray Wilder, St. Albans, W. Va., assignor to Monsanto Company, St. Louis, Mo., a corporation of Delaware
No Drawing. Filed Dec. 26, 1967, Ser. No. 693,110
Int. Cl. C07c *149/26, 149/06*
U.S. Cl. 260—609                                14 Claims

ABSTRACT OF THE DISCLOSURE

Reaction of mercaptans or hydrogen sulfide and olefinically unsaturated compounds in the presence of peroxide is promoted by an iron phthalocyanine co-catalyst.

---

The invention relates to an improved process for the preparation of mercaptans and sulfides by the condensation of olefinically unsaturated compounds with hydrogen sulfide or mercaptans. More particularly, the invention relates to the improvements in condensation of olefinically unsaturated compounds and hydrogen sulfide and mercaptans in the presence of peroxide catalyst wherein there is also present a co-catalyst comprising an iron phthalocyanine.

Peroxide catalyzes condensation of hydrogen sulfide and olefins. The catalyzed condensation takes place in direct opposition to Markownikoff's rule. Bell, U.S. Pat. 2,531,602, found that anhydrous aluminum chloride neutralized the directional effect and permited formation of secondary and tertiary mercaptans in the presence of peroxide catalyst. According to Walsh, U.S. Pat. 2,925,443, anhydrous aluminum chloride did not effectively catalyze the reaction of olefins and hydrogen sulfide in the presence of a peroxide, whereas anhydrous ferric chloride strongly catalyzed condensation of the anti-Markownikoff type. The yields were much higher when reaction was conducted at about −70° C. than at room temperature, but low temperature processes present several operational and economic difficulties. Although even water of hydration was said to be detrimental to the catalytic effect of ferric chloride, the addition of water was reported by May et al., U.S. Pat. 2,865,965, to increase reaction rate and to provide more complete conversion in the peroxide-catalyzed reaction under heat and pressure between hydrogen sulfide and olefins. Finely divided metals of Group VIII were also reported to catalyze the anti-Markownikoff addition of hydrogen sulfide to olefinically unsaturated compounds under heat and pressure in the presence of organic peroxide, Ford, U.S. Pat. 3,045,053. Optimum conditions were said to be pressures of about 500 to about 2,000 p.s.i.g. and temperatures of from 200° to 500° F.

The improvement of the present invention comprises reacting an olefinically unsaturated compound with hydrogen sulfide or organic mercaptan in the presence of a peroxide catalyst and an iron phthalocyanine. The iron phthalocyanine co-catalyst promotes condensation under ordinary temperature, apparently of the anti-Markownikoc type. Under the preferred conditions, the reaction appears to be indifferent to water. The iron phthalocyanine includes, for example, ferrous phthalocyanine and chloro-ferric phthalocyanine. The ratio of hydrogen sulfide to olefinically unsaturated compound is desirably in the range of 1 to 10 moles of hydrogen sulfide per mole of olefin. A ratio of about 2 moles of hydrogen sulfide per one mole of olefinically unsaturated compound is about optimum. Any of the peroxides known for promoting addition of hydrogen sulfide to olefins are suitable, but the preferred peroxides are organic hydroperoxides of which cumene hydroperoxide or tertiary-butyl hydroperoxide is preferred. The preferred concentration of cumene hydroperoxide is in the range of 7.5 to 10 parts by weight per three moles of olefin. Other suitable hydroperoxides are p-menthane hydroperoxide, pinane hydroperoxide, 2,5 - dimethylhexane-2.5-dihydroperoxide, tertiary-butyl hydroperoxide, and diisopropyl benzene hydroperoxide. Other peroxide catalysts are di-tertiary-butyl peroxide, benzoyl peroxide, methyl-ether peroxide, methyl-ethyl ketone peroxide, acetone peroxide, acetaldehyde peroxide, terpene peroxide, and tetraline peroxide.

The olefinically unsaturated compounds useful in the process comprise both acyclic and cyclic compounds containing olefinic unsaturation as, for example, ethene, propene, butenes, pentenes, hexenes, 2-methyl pentene-1, 2-methyl pentene-2, heptenes, 2,4,4-trimethyl pentene-1, 2,4,4-trimethyl pentene-2, octene-1, octene-2, nonenes, decene-1, undecene-1, dodecene-1, dodecene-2, 2,2,4,6,6-pentamethyl heptene-1, 2,4,4,6,6-pentamethyl heptene-2, 2,4,4,6,6 - pentamethyl heptene - 1, tridecene - 1, tetradecene-1, pentadecene-1, hexadecene-1, cetene-1, cetene-2, cyclopentene, methylpentene, cyclohexene, cyclooctene, cyclododecene, methylhexene, styrene, norbornylene, alpha-methyl styrene, camphene, pinene, bornylene, limonene, and dipentene. The order of addition of the ingredients may be varied as desired, but it is advantageous to add the peroxide to the mixture of the other ingredients. This affords a convenient method of controlling the reaction.

The following are specific embodiments of the invention illustrating the best method of carrying it out but are not to be taken as limitative.

EXAMPLE 1

To 210 parts by weight of cyclohexene there is added 0.01 part by weight of chloroferric phthalocyanine. The mixture is placed in an autoclave, cooled, and 200 parts by weight of hydrogen sulfide added thereto. The temperature is brought to about 21° C. and a solution of 7.5 parts by weight of 70% cumene hydroperoxide in 36 parts by weight of cyclohexene added thereto in small increments under nitrogen pressure. After each addition, the temperature rises slightly indicating a reaction. The mixture is stirred an additional one-half hour after completing the addition of the cumene hydroperoxide, vented, and the reaction mixture analyzed for mercaptan and monosulfide content. There is obtained about 310 parts by weight of reaction mixture containing 63% to 65% cyclohexyl mercaptan and about 6.6% of dicyclohexyl sulfide.

The yield is reduced only slightly (294 parts by weight of product containing 58% cyclohexyl mercaptan) when a mixture of cyclohexene and chloroferric phthalocyanine is fed to a mixture of hydrogen sulfide and cumene hydroperoxide.

Substituting 0.1 part by weight of anhydrous ferric chloride for the chloroferric phthalocyanine in the first procedure of Example 1 gives 261 parts by weight of reaction mixture after venting, which contains only 22.4% of cyclohexyl mercaptan. The yield is negligible if a little water is added with the ferric chloride. On the other hand, the addition of 82 parts by weight of water to the cyclohexene-chloroferric phthalocyanine mixture gives 315 parts by weight of reaction mixture containing 66% cyclohexyl mercaptan.

EXAMPLE 2

In the procedure of Example 1 the hydrogen sulfide is increased to 270 parts by weight and the cumene hydroperoxide to 12.5 parts by weight, the total cyclohexene remaining at 246 parts by weight. There is obtained 326 parts by weight of a reaction mixture containing 70.8% of cyclohexyl mercaptan and 6.6% dicyclohexyl sulfide.

Substituting tertiary-butyl hydroperoxide for cumene hydroperoxide in the procedure of Example 1 also gives a reaction mixture conataining about 70% cyclohexyl mercaptan. Increasing the tertiary butyl hydroperoxide to 10.0 parts by weight and reacting at 35°–40° C. gives 316.5 parts by weight of a reaction mixture containing 75.7% cyclohexyl mercaptan and 7.5% dicyclohexyl sulfide.

EXAMPLE 3

Recovered cyclohexene can be recycled for further reaction. Either fresh or recycled cyclohexene, 93.5 parts by weight, to which has been added 0.01 part by weight of chloroferric phthalocyanine, is charged into the autoclave and 95 parts by weight of hydrogen sulfide added thereto. In a separate pressure vessel is charged 16.4 parts by weight of cyclohexene and 6.4 parts by weight of cumene hydroperoxide. The autoclave temperature is brought up to about 20° C. and the peroxide solution fed continuously or stepwise over a period of one to two hours, letting the temperature of the reaction mixture rise to 30°–35° C. After addition is complete, the reaction is allowed to continue for about one hour; the hydrogen sulfide is vented and recovered is desired. The reaction mixture is transferred to a still equipped with a suitable column and subjected to distillation. The first cut up to 130° C. contains mostly cyclohexene and amounts to 33.8 parts by weight, which is recycled. The second cut, which boils from 158° to 160° C., is cyclohexyl mercaptan. About 100 parts by weight of cyclohexyl mercaptan is obtained. There remains a residue of about 14 parts by weight.

Other olefins are reacted in similar manner and typical results are tabulated below. To the indicated quantity of olefin within the range of 1.5–3.0 molecular proportions there is added 0.02 part by weight of chloroferric phthalocyanine co-catalyst. The mixture is placed in an autoclave, cooled, and the hydrogen sulfide added thereto. The hydrogen sulfide is distilled into the reaction mixture from a source at room temperature by cooling the autoclave and contents to a lower temperature. Cooling to 0°–10° C. permits a reasonable distillation rate. The catalyst (70% cumene hydroperoxide) is dissolved in a suitable solvent and gradually fed to the reaction mixture. The solvent may be a portion of the olefin to be reacted or solvent inert to the reactants, for example, cyclohexane or benzene. In the table the olefin charge is the total and includes any added with the peroxide. The addition of catalyst is begun when the reaction mixture is 5°–20° C. and is usually accompanied by a rise of temperature. Cooling is applied, if necessary, to keep the temperature of the reaction mixture from rising above about 40° C. After addition of the hydroperoxide catalyst, the reaction mixture is vented, either immediately or after allowing the reaction to continue for 15–30 minutes. The reaction product is then analyzed for mercaptan. In the case of olefins having low solubility for hydrogen sulfide, reaction in a mutual solvent is advantageous.

| Olefin and parts by weight thereof | Hydrogen sulfide, parts by weight | Catalyst Parts by weight | Catalyst Feed, time, minutes | Product, parts by weight | Mercaptan in product, percent |
|---|---|---|---|---|---|
| Neohexene 210 | 240 | 3 | 15 | 288 | [2] 68 |
| Hexene-1 252 | 213 | 7.5 | 60 | 325 | 69.8 |
| Cyclopentene 136 | 165 | 7.5 | 32 | 217 | 53.2 |
| Diisobutylene 168 [1] | 200 | 6.0 | 30 | 346 | 37.0 |
| Cyclooctene 165 [1] | 200 | 8.0 | 34 | 324 | 19.0 |

[1] 100 parts by weight of benzene is also added.
[2] 139 parts by weight of 3,3-dimethylbutanethiol, B.P. 134°–136° C. are obtained by fractional distillation.

Further reactions which illustrate the process with other olefins are tabulated below. To the indicated quantity of olefin there is added 0.025 part by weight of chloroferric phthalocyanine. The mixture is placed in an autoclave, cooled, and the hydrogen sulfide fed under pressure at 10° C., after which the mixture is allowed to warm to 20° C. The cumene hydroperoxide is fed with a portion of the olefin at 20° C. over a period of about one-half hour. In the table below the olefin charge is the total and includes the portion added with the peroxide. The reaction mixture is kept at 30° to 40° C. for one hour after all ingredients have been added and is distilled in vacuo. The boiling points given are at 20 mm. Hg pressure.

| Olefin and parts by weight thereof | Hydrogen sulfide, parts by weight | Cumene hydroperoxide, parts by weight | Product, parts by weight | Mercaptan in product, percent |
|---|---|---|---|---|
| Turpentine 422.5 | 210 | 7.5 | [1] 22 | [2] 97 |
| Alpha-pinene 422.5 | 210 | 7.5 | [3] 20 | 100 |
| 2-methyl-pentene-1 261 | 290 | 7.5 | ([4]) | 84.3 |
| 2-methyl-pentene-2 154 | 132 | 7.5 | [5] 186 | 68.8 |

[1] B.P. 105–120/ C.
[2] By iodine titration, 97% bornyl mercaptan. The yield is increased to 77 parts by weight of mercaptan fraction, B.P. 100°–110° C., by heating to 50° C. for eight hours and distilling. The fraction contains 91.8% of mercaptan.
[3] B.P. 120–130° C.
[4] Distillation yields 241 parts by weight of mercaptan, B.P. 45–54° C.
[5] Distillation yields 114 parts by weight of mercaptan, B.P. 42°–45° C.

The process is advantageous for the preparation of both unsymmetrical and symmetrical sulfides by condensation of mercaptans with olefinically unsaturated compounds. Any of the organic mercaptans appear to be suitable in the process and include methyl mercaptan, mercaptans corresponding to the olefinically unsaturated compounds mentioned above, phenyl mercaptan, tolyl mercaptan, and heterocyclic mercaptans, for example, mercaptobenzothiazole. Hydrocarbon mercaptans wherein the hydrocarbon is alkyl or alicyclic of 1 to 12 carbon atoms are preferred.

As illustrative of the use of a mercaptan in the process, 25 parts by weight of cyclohexene, 1 part by weight of 70% cumene hydroperoxide, 10 parts by weight of cyclohexyl mercaptan, and 0.025 part by weight of chloroferric phthalocyanine are stirred together for a few minutes. The resulting reaction mixture contains a 32.8% yield of dicyclohexyl sulfide based on cyclohexyl mercaptan, whereas in the absence of chloroferric phthalocyanine the yield is less than 1%.

It is intended to cover all changes and modifications of the examples of this invention herein chosen for purposes of disclosure which do not constitute departures from the spirit and scope of the invention.

I claim:

1. The process of making mercaptans and sulfides which comprises reacting a sulfur compound selected from the group consisting of hydrogen sulfide and hydrocarbon mercaptans where the hydrocarbon is alkyl or alicyclic of 1 to 12 carbon atoms with an acyclic or cyclic compound containing olefinic unsaturation condensable there-with in the conjoint presence of a catalytic amount of organic peroxide catalyst of olefinic condensation with the aforesaid sulfur compound and a catalytic amount of an iron phthalocyanine.

2. The process of claim 1 wherein the phthalocyanine is chloroferric phthalocyanine.

3. Making mercaptans by the process of claim 1 wherein the sulfur compound is hydrogen sulfide.

4. The process of claim 3 wherein the phthalocyanine is chloroferric phthalocyanine.

5. The process of claim 1 wherein the olefinically unsaturated compound is cyclohexene and the phthalocyanine is chloroferric phthalocyanine and the peroxide is an organic hydroperoxide.

6. The process of claim 3 wherein the olefinically unsaturated compound is cyclohexene and the phthalocyanine is chloroferric phthalocyanine and the peroxide is an organic hydroperoxide.

7. The process of claim 6 wherein the peroxide is cumene hydroperoxide.

8. The process of claim 6 in which the reaction is effected by adding the cumene hydroperoxide to the cyclohexene, hydrogen sulfide, and chloroferric phthalocyanine.

9. The process of claim 8 wherein the reaction is carried out at temperature within the range of about 5° C. to about 40° C.

10. The process of claim 3 wherein the olefinically unsaturated compound is an alicyclic olefin of 5 to 12 carbon atoms and the phthalocyanine is chloroferric phthalocyanine and the peroxide is cumene hydroperoxide or tertiary butyl hydroperoxide.

11. The process of claim 3 wherein the olefinically unsaturated compound is an acyclic olefin of 5 to 8 carbon atoms and the phthalocyanine is chloroferric phthalocyanine and the peroxide is cumene hydroperoxide or tertiary butyl hydroperoxide.

12. The process of claim 3 wherein the olefinically unsaturated compound is neohexene and the phthalocyanine is chloroferric phthalocyanine and the peroxide is cumene hydroperoxide or tertiary butyl hydroperoxide.

13. Making sulfides by the process of claim 1 wherein the sulfur compound is an organic mercaptan and the phthalocyanine is chloroferric phthalocyanine.

14. The process of claim 13 wherein the organic mercaptan is a hydrocarbon mercaptan and the hydrocarbon is alkyl or alicyclic of 1 to 12 carbon atoms and the peroxide is cumene hydroperoxide or tertiary butyl hydroperoxide.

References Cited

UNITED STATES PATENTS 2,531,602  11/1950  Bell _____ 260—609

CHARLES B. PARKER, Primary Examiner

D. R. PHILLIPS, Assistant Examiner

U.S. Cl. X.R.

260—304